United States Patent
Groendahl et al.

(10) Patent No.: US 8,803,348 B2
(45) Date of Patent: Aug. 12, 2014

(54) WIND TURBINE

(75) Inventors: Erik Groendahl, Them (DK); Hans-joergen Thougaard, Silkeborg (DK)

(73) Assignee: Siemens Aktiengesellschaft, Munich (DE)

( * ) Notice: Subject to any disclaimer, the term of this patent is extended or adjusted under 35 U.S.C. 154(b) by 74 days.

(21) Appl. No.: 13/396,950

(22) Filed: Feb. 15, 2012

(65) Prior Publication Data

US 2012/0217746 A1 Aug. 30, 2012

(30) Foreign Application Priority Data

Feb. 25, 2011 (EP) .................................... 11155931

(51) Int. Cl.
*F03D 9/00* (2006.01)
*H02P 9/04* (2006.01)

(52) U.S. Cl.
USPC .............................................. 290/44; 290/55

(58) Field of Classification Search
USPC ....................................................... 290/44, 55
See application file for complete search history.

(56) References Cited

U.S. PATENT DOCUMENTS

| | | | | |
|---|---|---|---|---|
| 2006/0103137 A1* | 5/2006 | Wobben | .......................... | 290/44 |
| 2007/0057677 A1* | 3/2007 | Koch et al. | ..................... | 324/536 |
| 2007/0210656 A1* | 9/2007 | Lafontaine et al. | .............. | 310/58 |
| 2008/0018275 A1* | 1/2008 | Dooley | .......................... | 318/268 |
| 2008/0265697 A1* | 10/2008 | Bischof et al. | .................. | 310/51 |
| 2009/0128072 A1* | 5/2009 | Strong et al. | .............. | 318/400.17 |
| 2009/0302792 A1* | 12/2009 | Osada et al. | .............. | 318/400.21 |
| 2009/0315329 A1* | 12/2009 | Duffey et al. | .................... | 290/44 |
| 2010/0253163 A1* | 10/2010 | Lafontaine et al. | .............. | 310/58 |
| 2010/0327674 A1* | 12/2010 | Marsh et al. | ..................... | 310/44 |
| 2011/0043196 A1* | 2/2011 | Fujita et al. | .............. | 324/207.16 |
| 2011/0101817 A1* | 5/2011 | Hao et al. | ................ | 310/216.074 |
| 2011/0181146 A1* | 7/2011 | Asano et al. | ..................... | 310/208 |
| 2011/0248507 A1* | 10/2011 | Petersen et al. | .................. | 290/55 |
| 2011/0254474 A1* | 10/2011 | Saito et al. | ..................... | 318/139 |
| 2011/0260571 A1* | 10/2011 | Kashihara | ..................... | 310/207 |
| 2011/0304237 A1* | 12/2011 | Stiesdal | ........................ | 310/195 |

FOREIGN PATENT DOCUMENTS

| | | | | |
|---|---|---|---|---|
| EP | 1416604 A2 | 5/2004 | | |
| EP | 1768223 A2 | 3/2007 | | |
| EP | 2096732 A1 | 9/2009 | | |
| EP | 2228897 A1 | 9/2010 | | |
| ES | 2325844 | * | 9/2009 | .............. F03D 9/002 |
| WO | WO 2008119864 A1 | 10/2008 | | |

* cited by examiner

*Primary Examiner* — Tulsidas C Patel
*Assistant Examiner* — Thomas Quigley

(57) ABSTRACT

A wind turbine is provided. The wind turbine includes at least one generator adapted to generate electric power and a plurality of electrical converter units adapted to convert electric power generated by the generator and electrically connectable or connected to the generator and to a utility grid. The generator includes a stator being segmented in stator segments. Each stator segment includes a plurality of stator windings. The stator windings of the respective stator segments are divided into at least a first and a second group of stator windings with each group including at least one stator winding. Several or all first groups of stator windings are electrically connected to a first electrical converter unit and several or all second groups of stator windings are electrically connected to a second electrical converter unit.

11 Claims, 5 Drawing Sheets

WIND TURBINE

CROSS REFERENCE TO RELATED APPLICATIONS

This application claims priority of European Patent Office application No. 11155931.6 EP filed Feb. 25, 2011. All of the applications are incorporated by reference herein in their entirety.

FIELD OF INVENTION

The invention relates to a wind turbine, comprising at least one generator adapted to generate electric power and a number of electrical converter units adapted to convert electric power generated by the generator and electrically connectable or connected to the generator and to a utility grid.

BACKGROUND OF INVENTION

Usually, wind turbines run at almost constant rotational speed with direct grid connection. However, since the amount of wind energy, i.e. the aerodynamic conditions may vary, indirect grid connections are known, whereby the wind turbine generator runs in its own, separate alternating current (AC) grid. This grid is usually controlled by an inverter, so that the frequency of the alternating current in the stator of the generator may be adapted to the current rotational speed of the rotor hub of the wind turbine, i.e. the wind turbine will generate alternate current at exactly the variable frequency applied to the stator.

Since alternating current with a variable frequency cannot be applied to the utility grid, it needs to be rectified or converted into direct current (DC). The conversion from variable frequency AC to DC can be executed by thyristors or transistors, for instance. Further, the direct current is reconverted to an alternating current having a frequency applicable to the utility grid. Again, either thyristors or transistors may be used to convert the direct current into alternating current. Thereby, the gained alternating current usually needs to be smoothed before it is supplied to the utility grid. Therefore, AC filter mechanism using appropriate inductances and capacitors may be used, for instance.

In order to improve the power quality of the power applied to the grid, modern wind turbines comprising a generator and a number of electrical converter units have been proposed since, by using a plurality of converter units a better control of reactive power is feasible. A typical example is disclosed in EP 1 768 223 A2 showing a wind turbine having a number of converter modules in parallel configuration.

Yet, it is a drawback of prior art using indirect grid connections, that availability rates of the wind turbines are often lower in comparison to wind turbines having a direct grid connection due to failures in the power electronics, that is mainly the electrical converter units.

SUMMARY OF INVENTION

Thus, it is the object of the present invention to provide an improved wind turbine, particularly regarding its availability rate.

This is achieved by a wind turbine as describes before, wherein the generator comprises a stator being segmented in stator segments, with each stator segment comprising a number of stator windings, wherein the stator windings of the respective stator segments are divided into at least a first and a second group of stator windings with each group comprising at least one stator winding, whereby several or all first groups of stator windings are electrically connected to a first electrical converter unit and several or all second groups of stator windings are electrically connected to a second electrical converter unit.

The inventive wind turbine has a generator with a segmented stator, that is the stator is built of a number of respective stator segments. The respective stator windings of each stator segment are divided or arranged in respective groups of stator windings. Thereby, preferably each group comprises the same number of stator windings, that is the windings are preferably equally distributed in respective groups. The number of groups per stator segment is at least two, that is a stator segment comprises at least a first and a second group of stator windings. Thereby, the inventive principle proposes to electrically connect several or all first groups of stator windings to a first electrical converter unit and several or all second groups of stator windings to a second electrical converter unit. Thus, respective groups of stator windings of respective stator segments are electrically connected to respective separate electrical converter units, that is the respective first groups of stator windings throughout all stator segments of the stator are related to a first electrical converter unit, the respective second groups of stator windings throughout all stator segments of the stator are related to a second electrical converter unit, etc. Further exemplary embodiments of the inventive principle will be given with respect to the figures.

The inventive principle allows that faults in an electrical converter unit may be isolated, whereby the remainder of the electrical converter units may still be operated. Hence, even if failures in a first electrical converter unit occur, the inventive wind turbine may still supply power to the utility grid since all other electrical converter units may still be operated. In such a manner, the present invention overcomes the drawbacks from prior art since, even in the case of a failure of an electrical converter unit, the wind turbine is still ready to operate, even though with a reduced power output.

Due to the division of the stator windings of each stator segment in respective independent groups of stator windings being separately connected to respective electrical converter units, it is ensured that in case of a failure of one or more electrical converter units, the same respective group of stator windings in each stator segment does not contribute to the power output of the wind turbine. Hence, torque asymmetry in the stator as well as generated harmonic and sub-harmonic frequencies are reduced.

It is preferred that the number of groups of stator windings of each stator segment corresponds to the number of electrical converter units. In such a manner, a direct relation of the respective first, second, third, etc. groups of stator windings of the respective stator segments to respective first, second, third, etc. electrical converter units is possible.

It is of advantage that the groups of stator windings are electrically (galvanic) insulated from each other. In such a manner, any undesired electrical interactions like short circuits or the like between respective groups of stator windings within a stator segment are inhibited, so that operating safety of the respective stator segments, the stator and the generator is assured. Electrical insulation is provided by appropriate insulating means allowing a galvanic insulation, that is mainly inductive or capacitive insulation as provided by transformers for instance.

In a further embodiment of the invention, the stator windings of a group of stator windings are electrically connected with each other. Hence, the stator windings of each group of stator windings are electrically connected. Thereby, the electrical connection is preferably realised by galvanic coupling, whereby star-point connections being capable of electrically connecting an arbitrary number of stator windings are favourably used.

It is possible that groups of stator windings of different stator segments being electrically connected to the same electrical converter unit are electrically insulated from each other. Alternatively, it is possible that groups of stator windings of different stator segments being electrically connected to the same electrical converter unit are electrically connected with each other. In the latter case, an electrical connection of respective groups of stator windings of different stator segments is achievable. Again, electrical insulation/connection is preferably provided by galvanic insulation/coupling. Hence, respective electronic components such as transformers or the like are provided if need be.

The electrical converter units are favourably connected in parallel. Yet, in exceptional cases a serial connection of respective electrical converter unit is thinkable as well, whereby electrical bridgings may be necessary in order to bridge faulty electrical converter units if need be.

Each electrical converter unit may comprise at least one electrical breaker, at least one generator side rectifier, at least one utility grid side rectifier, at least one generator side inverter, at least one utility grid side inverter, at least one DC-link, and at least one control unit. Hence, the respective electrical converter units are provided with the essential electrical components required for an indirect grid connection, that is the respective electrical converter units are ready to convert AC with variable frequencies supplied from the generator during its operation to AC with fixed frequency applicable to a utility grid.

The stator segments may comprise a single layer or a double layer configuration, with the double-layer configuration having slots, with each slot being adapted to accommodate first and second stator windings, whereby the first stator windings are disposed on top of the second stator windings. In the latter case, it is preferred that the first stator windings build a first group of stator windings and the second stator windings build a second group of stator windings, wherein the first and second group of the stator windings are electrically connected to separate electrical converter units. Hence, the two separate windings in each slot of the respective stator segment are related to separate groups of stator windings and further, electrically connected to separate, that is respective first and second electrical converter units. In such a manner, the inventive principle is easily applicable to stator segments having double-layer winding configurations as well.

BRIEF DESCRIPTION OF THE DRAWINGS

In the following, the invention is described in detail as reference is made to the figures, whereby.

DETAILED DESCRIPTION OF INVENTION

Figure 1:
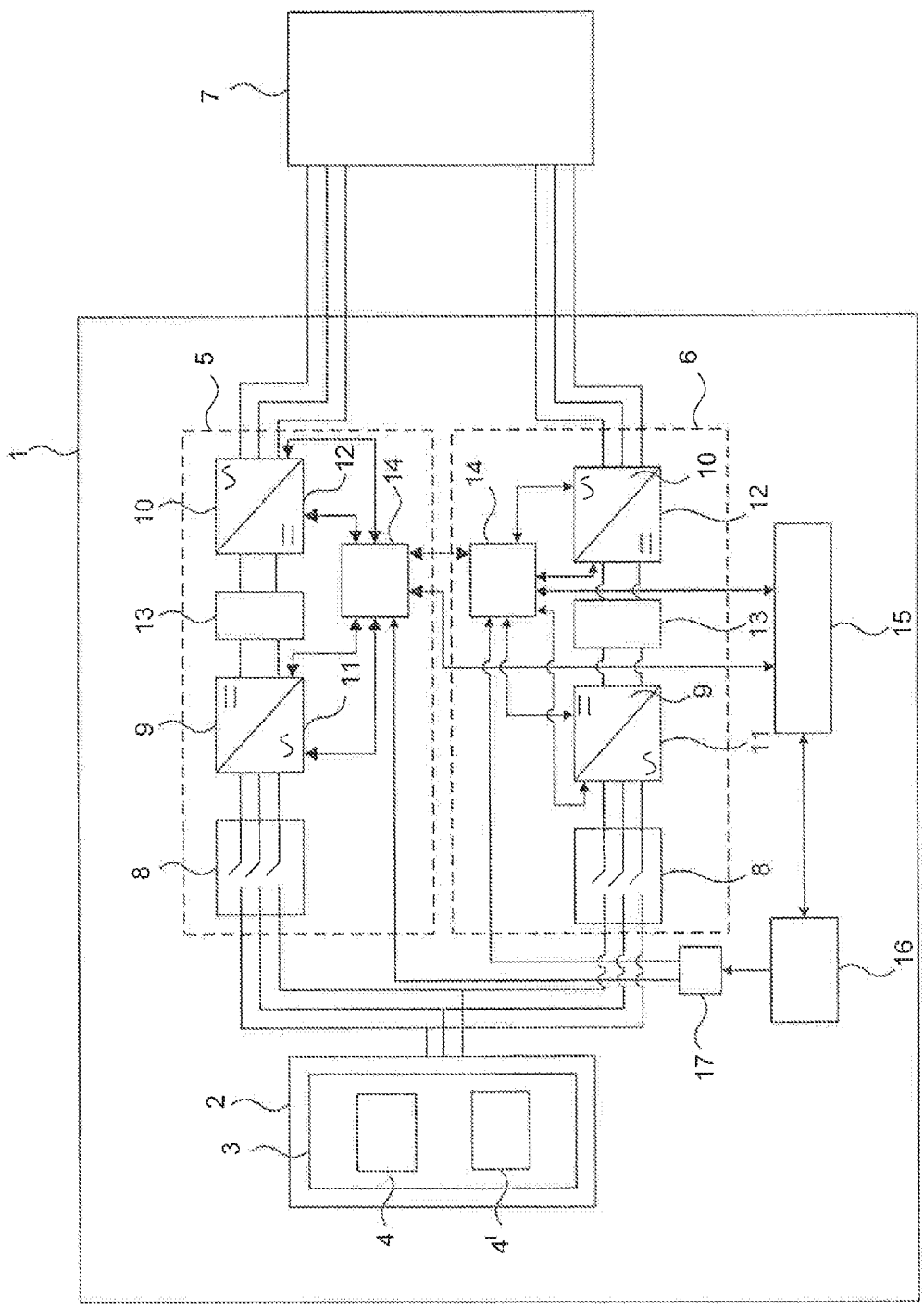
FIG. 1 shows a block diagram representation of a wind turbine according to an exemplary embodiment of the present invention.

FIG. 1 shows a block diagram representation of a wind turbine 1 as denoted by the rectangle, whereby only components of the wind turbine 1 having relevance in terms of the present invention are depicted. The wind turbine 1 comprises a generator 2 adapted to generate electric power during operation of the wind turbine 1. The generator 2 comprises a segmented stator 3. That is, the stator 3 is built of a number of stator segments 4, 4', etc. each comprising a number of stator windings (cf. FIGS. 2-4). The generator 2 is mechanically connected to a rotor hub (not shown) of the wind turbine 1 in known manner.

The wind turbine 1 further comprises a number of electrical converter units 5, 6 adapted to convert electric power generated by the generator 2 into electric power applicable to a utility grid 7. The electrical converter units 5, 6 have a parallel configuration, that is are connected in parallel. Each electrical converter unit 5, 6 is electrical connectable or connected to the generator 2 and to the utility grid 7. Since the generator 2 is preferably built as a three-phase generator, the generator 2 is connected to each electrical converter unit 5, 6 by three respective output lines.

The wind turbine 1 is provided with an indirect grid connection, that is the electrical converter units 5, 6 comprise respective components allowing a conversion of AC with variable frequency supplied from the generator 2 to AC with fixed frequency applicable to the utility grid 7. Accordingly, each electrical converter unit 5, 6 comprises an electrical breaker 8, a generator side rectifier 9, a utility grid side rectifier 10, a generator side inverter 11, a utility grid side inverter 12, a DC-link 13, and a control unit 14.

The respective control units 14 communicate with the respective rectifiers 9, 12, the respective converters 11, 10 and a central control unit 15 of the wind turbine 1. The central control unit 15 is adapted to communicate with a park control unit 16 being used for regulation of a wind park comprising a number of respective wind turbines 1. That is, the park control unit 16 allows to control active and reactive power of individual wind turbines, such as the present wind turbine 1 as well as clusters of wind turbines within a wind park. The park control unit 16 also communicates with the respective control units 14 of the electrical converter units 5, 6 by means of a standard network switch 17 such as an Ethernet switch. Further, the respective control units 14 of the electrical converter units 5, 6 are ready to communicate with each other.

Figure 2:
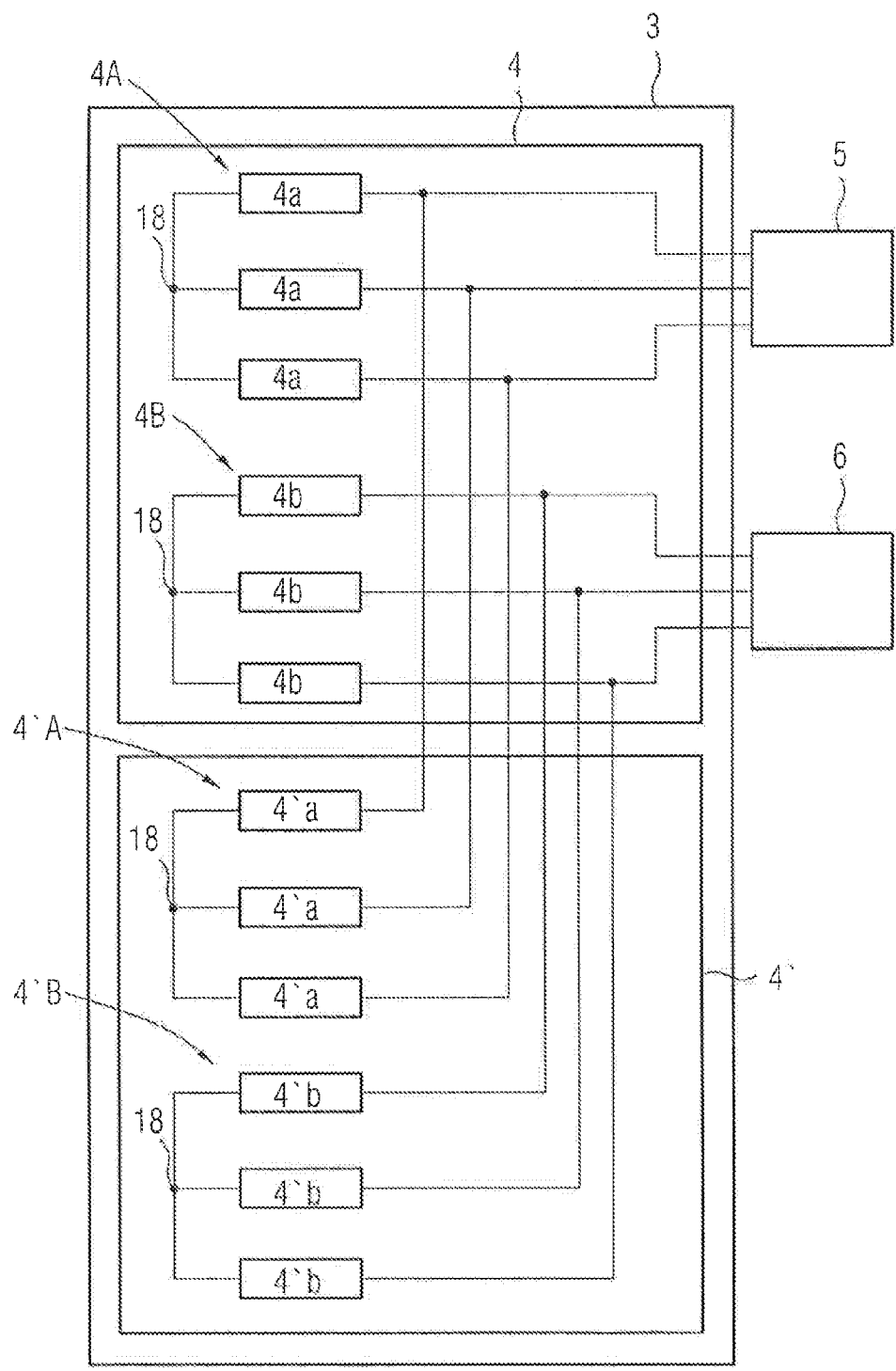
FIG. 2 shows a block diagram of a segmented stator according to one exemplary embodiment of the present invention.

FIG. 2 shows a block diagram of a segmented stator 3 according to one exemplary embodiment of the present invention. The stator windings 4a, 4b, of the stator segment 4 as well as the stator windings 4'a, 4'b of the stator segment 4' are divided into respective first and second groups 4A, 4B and 4'A, 4'B of stator windings, whereby the stator segment 4 comprises group 4A consisting of three respective stator windings 4a and group 4B consisting of three respective stator windings 4b. Accordingly, the stator segment 4' comprises group 4'A consisting of three respective stator windings 4'a and group 4'B consisting of three respective stator windings 4'b. Hence, each first group 4A, 4'A and second group 4B, 4'B comprises three stator windings. That is, each group 4A, 4B, 4'A, 4'B has a three-phase generator output since each group 4A, 4B, 4'A, 4'B comprises three stator windings as described before.

As is further discernible, all first groups 4A, 4'A throughout the stator segments 4, 4' are electrically connected to the electrical converter unit 5, whereas all second groups 4B, 4'B of the respective stator segments 4, 4' are electrically connected to the electrical converter unit 6. Hence, the division of the stator windings 4a, 4b, 4'a, 4'b of the respective stator segments 4, 4' into the respective groups 4A, 4B, 4'A, 4'B allows a separate connection of the respective first groups 4A, 4'A and second groups 4B, 4'B with the electrical converter units 5, 6. That is, since the number of groups 4A, 4B, 4'A, 4'B of each stator segment 4, 4' corresponds to the number of electrical converter units 5, 6, each stator segment 4, 4' is electrically coupled to both of the electrical converter units 5, 6. In such a manner, the availability rate of the wind turbine 1 is ensured. That is, even in the case of a failure of one of the electrical converter units 5, 6 the respective other electrical converter unit 5, 6 may still be operated.

As will be explained on the basis of the group 4A, the stator windings 4a are electrically connected with each other by means of a star-point connection 18. The same applies to the respective stator windings 4b, 4'a, and 4'b of the groups 4B and 4'A, and 4'B being connected to the same electrical converter unit 5, 6. All groups 4A, 4B and 4'A, 4'B of the respective stator segments 4, 4' are galvanic insulated from each other.

Of course, the inventive principle is likewise applicable to a generator 2 having a stator 3 with more than two segments 4, 4'. In this case, a respective division of the stator windings of the respective further stator segments would be also in two, that is a first and second group, whereby the first groups of stator windings would be electrically connected to the electrical converter unit 5 and the respective second groups of stator windings would be electrically connected to the electrical converter unit 6.

Figure 3:
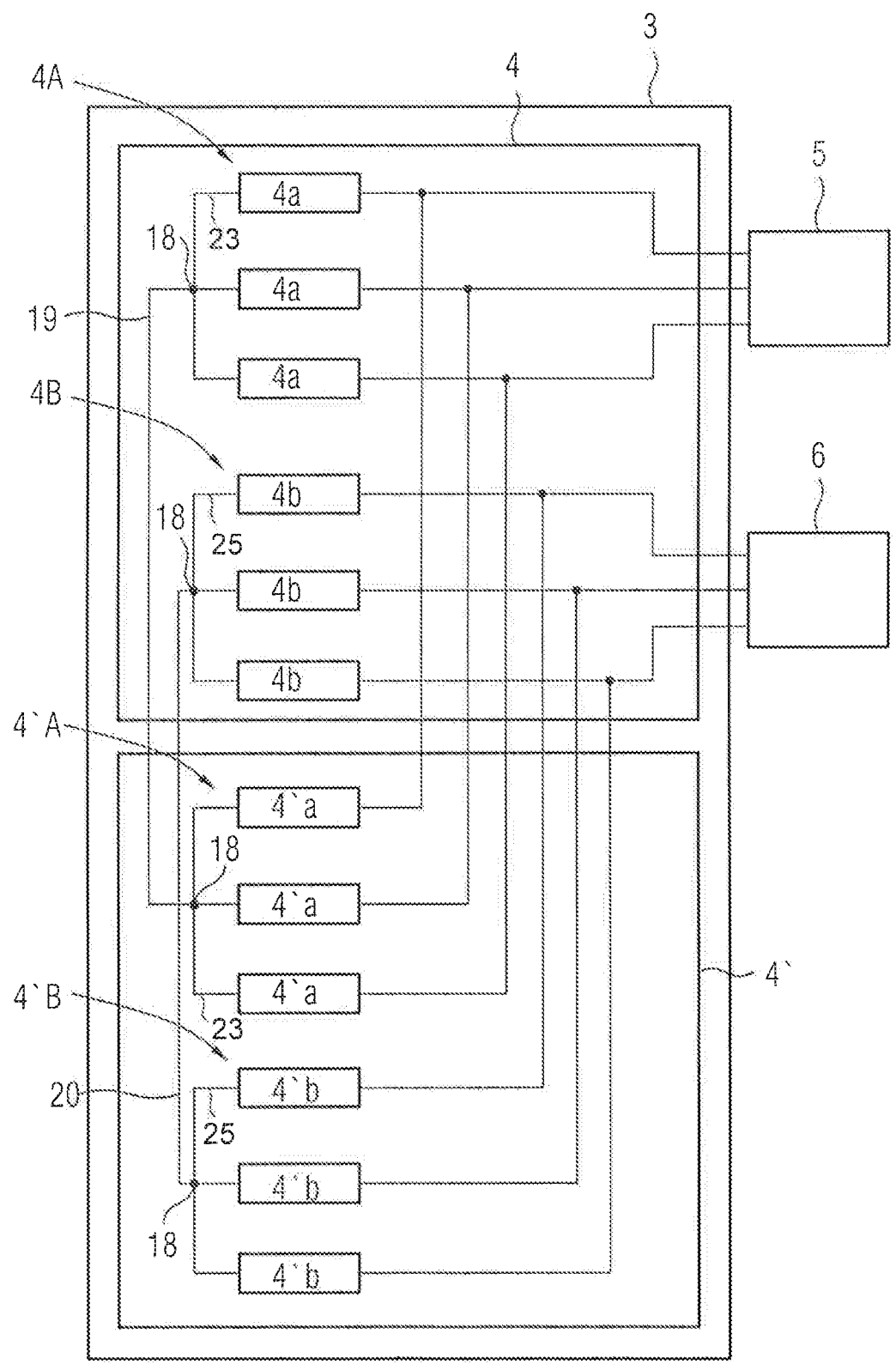
FIG. 3 shows a block diagram of a segmented stator according to another exemplary embodiment of the present invention.

In contrast to the embodiment shown in FIG. 2 depicting that groups 4A, 4'A and 4B, 4'B of the different stator segments 4, 4' being electrically connected to the same electrical converter units 5, 6 are electrically insulated from each other, FIG. 3 shows that it is also possible that respective groups 4A, 4'A and 4B, 4'B of the different stator segments 4, 4' being electrically connected to the same electrical converter units 5, 6 may be electrically connected with each other, as indicated by connection lines 19, 20. Each connection line 19, 20 is respectively connected to respective electrical sides 23, 25 of the stator windings not connected to the electrical converter units 5, 6, as seen in FIG. 3. Thereby, connection line 19 establishes a connection of group 4A of stator segment 4 with group 4'A of stator segment 4' and connection line 20 establishes a connection of group 4B of stator segment 4 with group 4'B of stator segment 4'.

Figure 4:
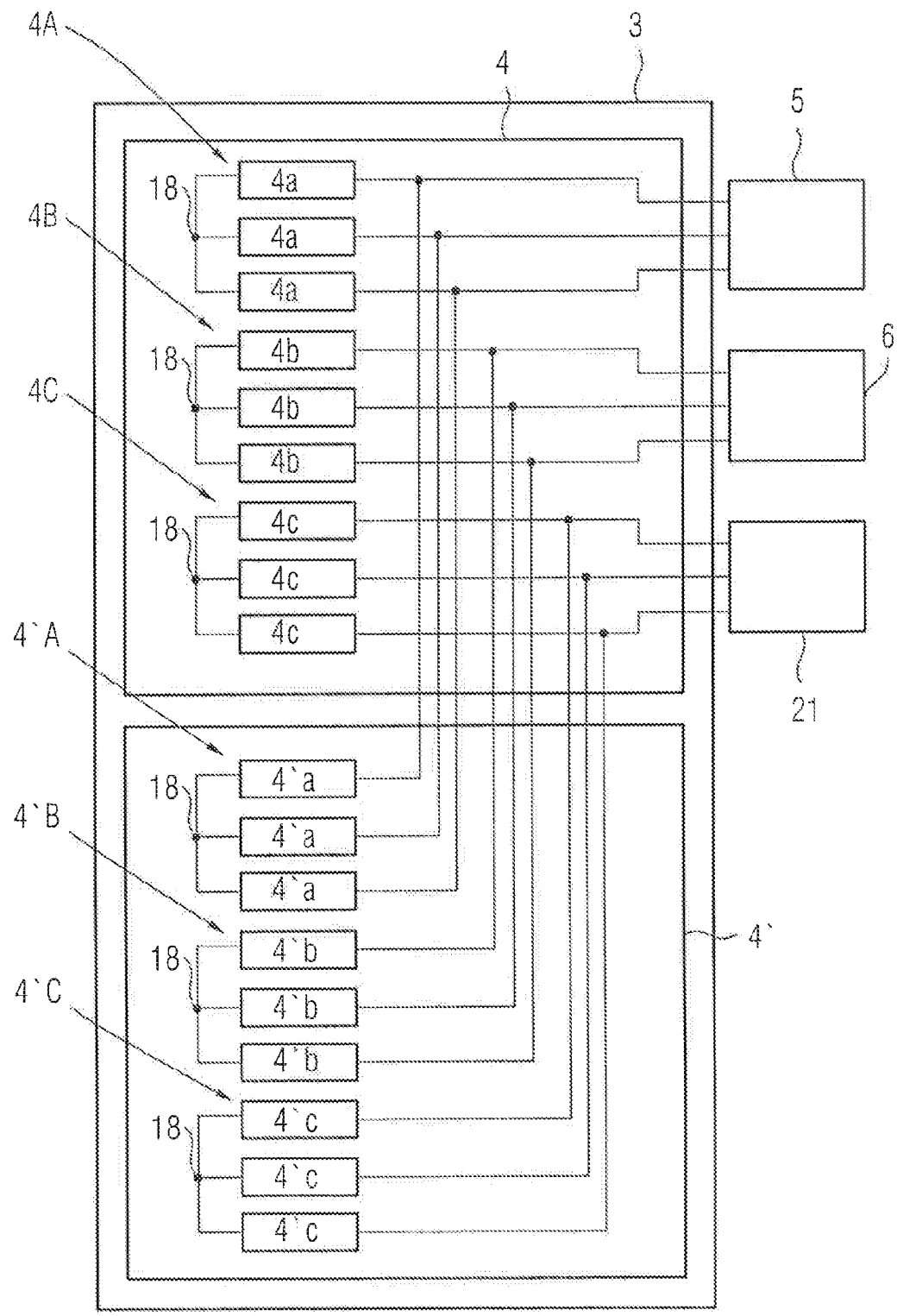
FIG. 4 shows a block diagram of a segmented stator according to yet another exemplary embodiment of the present invention.

FIG. 4 shows a block diagram of a segmented stator according to yet another exemplary embodiment of the present invention. In this example, each stator segment 4, 4' comprises nine stator windings. That is stator segment 4 comprises the stator windings 4a, 4b, and 4c, whereas stator segment 4' comprises the stator windings 4'a, 4'b, and 4'c. The respective stator windings 4a, 4b, and 4c of the stator segment 4 are accordingly grouped in three groups 4A, 4B, 4C, whereby each group 4A, 4B, 4C comprises three respective stator windings 4a, 4b, 4c. The same applies to the stator segment 4' having three groups 4'A, 4'B, 4'C each comprising three stator windings. That is, the stator winding 4'a, 4'b, 4'c.

Since each stator segment 4, 4' comprises three groups 4A, 4B, 4C, 4'A, 4'B, 4'C, a respective number, that is three converter units 5, 6, 21 are provided, so that the number of groups per stator segment 4, 4' corresponds to the number of electrical converter units 5, 6, 21.

Figure 5:
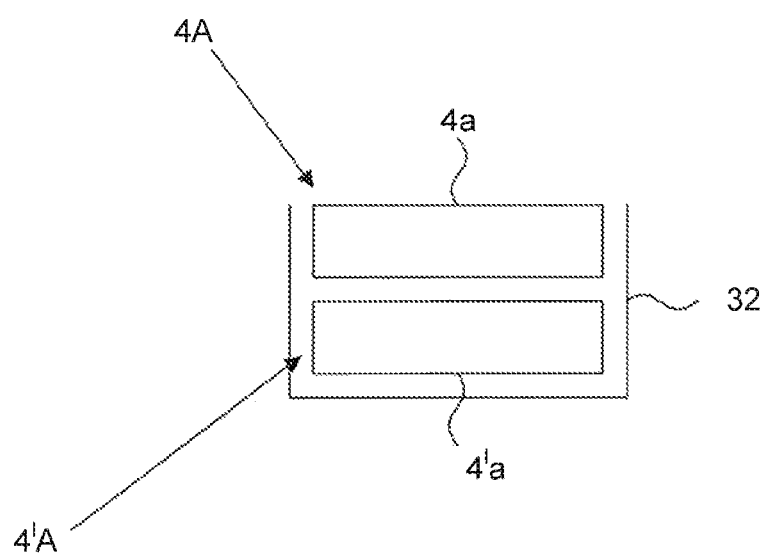
FIG. 5 shows a block diagram of a segmented stator comprising a double-layer configuration in accordance with further aspects of the present invention.

In one example embodiment, the inventive wind turbine 1 may comprise stator segments 4, 4', etc. having a single or a double-layer configuration, as conceptually shown in FIG. 5, whereby regarding the double-layer configuration respective stator segments comprise slots, with each slot (e.g. slot 32) being adapted to accommodate first and second stator windings 4a, 4'a, whereby the first stator windings are disposed on top of the second stator windings. In this case, the first stator windings build a first group 4A of stator windings and the second stator windings build a second group 4'A of stator windings, so that the inventive principle is still applicable to stator segments comprising a double-layer winding configuration. That is, each group of stator windings is separately connected to respective electrically converter units.

The invention claimed is:

1. A wind turbine, comprising:
   at least one generator adapted to generate electric power, and
   a plurality of electrical converter units adapted to convert electric power generated by the generator and electrically connectable or connected to the generator and to a utility grid,
   wherein the at least one generator comprises a stator that is segmented in stator segments,
   wherein each stator segment comprises a plurality of stator windings, wherein the stator windings of the respective stator segments are divided into at least a first group of stator windings and a second group of stator windings,
   wherein each stator winding of a stator segment of the first group has a common phase angle with a stator winding of a stator segment of the second group and the common phase angle is different from the phase angle of any other stator windings of the same stator segment, each of the first and second groups comprising at least one stator winding, and
   wherein several or all first groups of stator windings are electrically connected to a first electrical converter unit and several or all second groups of stator windings are electrically connected to a second electrical converter unit,
   wherein groups of stator windings of different stator segments that are electrically connected to the same electrical converter unit are electrically connected with each other by way of a connection line to respective electrical sides of the stator windings not connected to the electrical converter unit.

2. The wind turbine according to claim 1, wherein the number of groups of stator windings of each stator segment corresponds to the number of electrical converter units.

3. The wind turbine according to claim 1, wherein the groups of stator windings are electrically insulated from each other.

4. The wind turbine according to claim 1, wherein the stator windings of a group of stator windings are electrically connected with each other by way of a star point connection.

5. The wind turbine according to claim 1, wherein groups of stator windings of different stator segments that are electrically connected to the same electrical converter unit are electrically insulated from each other.

6. The wind turbine according to claim 1, wherein the electrical converter units are connected in parallel.

7. The wind turbine according to claim 1, wherein each electrical converter unit comprises:
   at least one electrical breaker,
   at least one generator side rectifier,
   at least one utility grid side rectifier,
   at least one generator side inverter, at least one utility grid side inverter,
at least one DC-link, and
at least one control unit.

8. The wind turbine according to claim 1, wherein the stator segments comprise a single layer configuration.

9. The wind turbine according to claim 1, wherein the stator segments comprise a double layer configuration, the double-layer configuration having slots, with each slot being adapted to accommodate first and second stator windings, wherein the first stator windings are disposed on top of the second stator windings.

10. The wind turbine according to claim 9, wherein the first stator windings build a first group of stator windings and the second stator windings build a second group of stator windings, wherein the first and second group of stator windings are electrically connected to separate electrical converter units.

11. A wind turbine, comprising:
at least one generator adapted to generate electric power, and
a plurality of electrical converter units adapted to convert electric power generated by the generator and electrically connectable or connected to the generator and to a utility grid,
wherein the at least one generator comprises a stator that is segmented in stator segments,
wherein each stator segment comprises a plurality of stator windings, wherein the stator windings of the respective stator segments are divided into at least a first group of stator windings and a second group of stator windings,
wherein each stator winding of a stator segment of the first group has a common phase angle with a stator winding of a stator segment of the second group and the common phase angle is different from the phase angle of any other stator windings of the same stator segment, each of the first and second groups comprising at least one stator winding, and
wherein several or all first groups of stator windings are electrically connected to a first electrical converter unit and several or all second groups of stator windings are electrically connected to a second electrical converter unit,
wherein the stator segments comprise a double layer configuration, the double-layer configuration having slots, with each slot being adapted to accommodate first and second stator windings, wherein the first stator windings are disposed on top of the second stator windings.

* * * * *